United States Patent [19]

Carre et al.

[11] 4,072,484
[45] Feb. 7, 1978

[54] BAG FILTER

[75] Inventors: Christian Carre, Houilles; Jean-Pierre Guibet, Gamilly-Vernon; Albert Rebours, Chatou; André Rigal, Le Pecq, all of France

[73] Assignee: Air Industrie, Courbevoie, France

[21] Appl. No.: 704,647

[22] Filed: July 12, 1976

[30] Foreign Application Priority Data

July 25, 1975 France .............................. 75 23301

[51] Int. Cl.² ........................................... B01D 46/02
[52] U.S. Cl. ........................................ 55/379; 55/381
[58] Field of Search .................. 55/381, 379, 483, 484, 55/500

[56] References Cited

U.S. PATENT DOCUMENTS 3,880,628  4/1974  Gustavsson ........................... 55/500

FOREIGN PATENT DOCUMENTS 2,201,111  4/1974  France .................................. 55/379
2,424,236  2/1975  Germany ............................... 55/379
1,187,646  4/1970  United Kingdom ................... 55/365

Primary Examiner—Bernard Nozick
Attorney, Agent, or Firm—Larson, Taylor and Hinds

[57] ABSTRACT

A filter bag for a filter system, comprising a number of parallel channels embodied by interconnecting, along parallel assembly lines distributed over pocket length, two opposite side walls of the pockets. The side walls meet at the open end of the pocket; a frame is introduced into each channel, the frame having two substantially parallel members which extend in a plane perpendicular to the main direction of the pocket, such plane being equidistant from the two assembly lines forming the lateral boundaries of the particular channel concerned. At the bottom bag end near the bag end remote from the open end of the bag, the two substantially parallel members meet by way of a bottom member which is substantially perpendicular to the plane of the two substantially parallel members - that is which extends substantially in the main direction of the bag.

13 Claims, 6 Drawing Figures

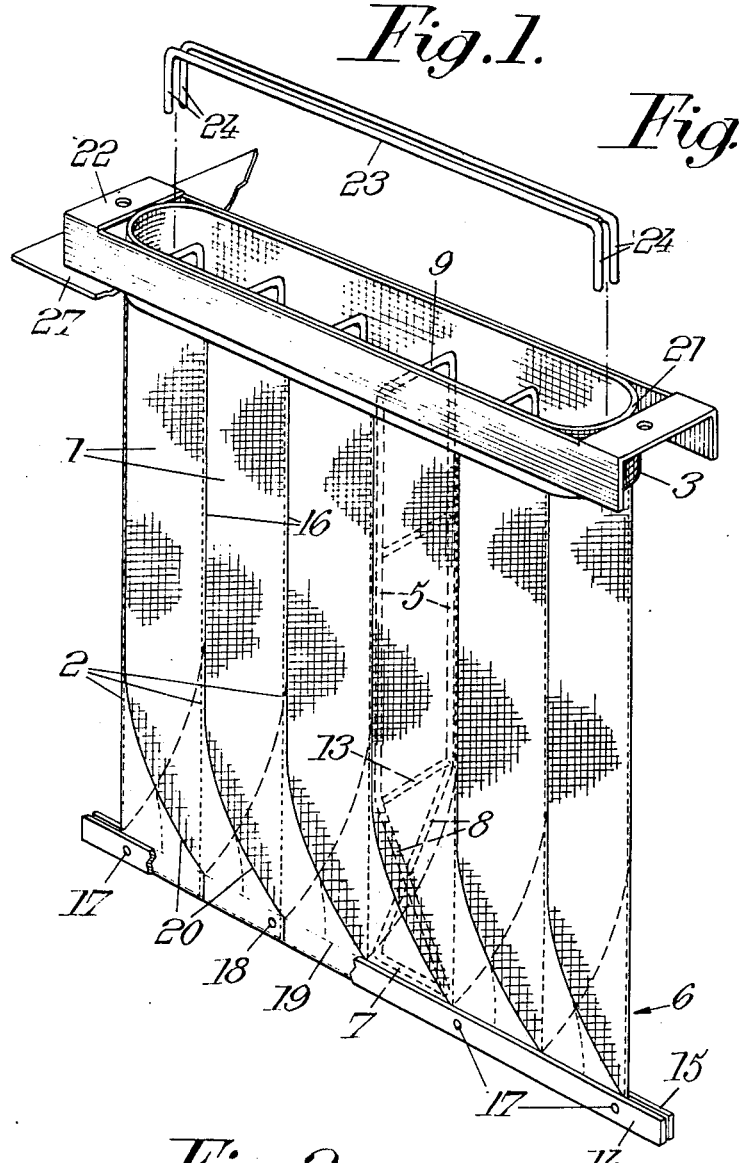
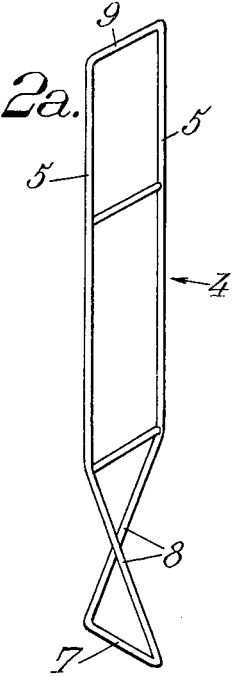
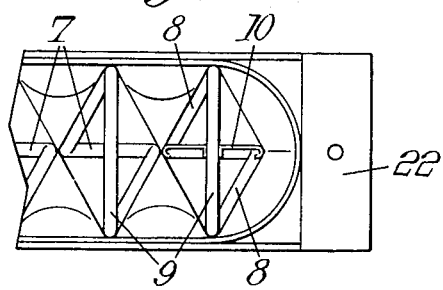
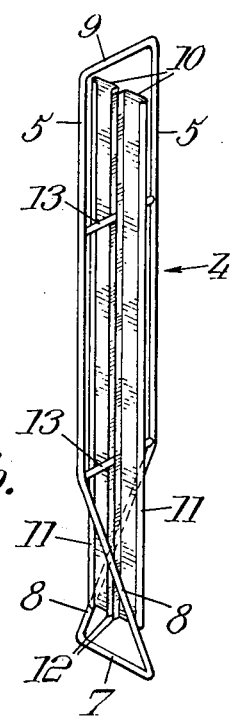

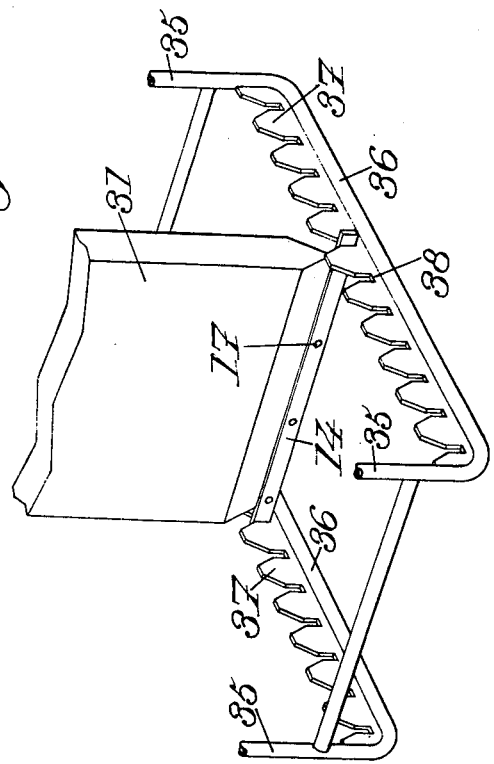
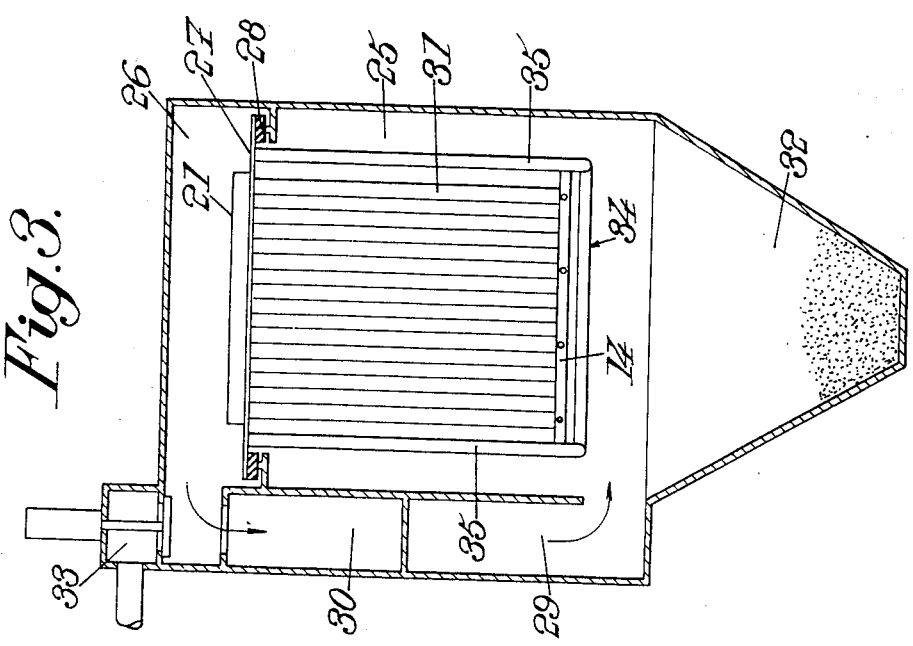

BAG FILTER

This invention relates to a filter bag for a filter system, of the kind comprising a number of parallel channels embodied by interconnecting, along parallel assembly lines distributed over pocket length, two opposite side walls of the pockets, the side walls meeting at the open end of the pocket; and a frame introduced into each channel, the frame having two substantially parallel members which extend in a plane perpendicular or substantially perpendicular to the main direction of the pocket, such plane being equidistant from the two assembly lines forming the lateral boundaries of the particular channel concerned.

A filter bag of this kind has been disclosed in French Patent Application No. 72 34 193 of Sept. 27 1972, wherein the bottom parts of the parallel frame members are interconnected by a part curving towards the inside of the frame that is— towards the inside of the corresponding bag pocket — and the curved part is borne on a rigid bottom structure of circular cross-section and extending over the whole length of the bag. Since the filter system comprises a number of bags disposed in parallel relationship to one another, the gaps between the bottom rigid structures are narrow and hinder the flow of the gas to be filtered and give rise to turbulence, since the gas for filtering flows through the bag side walls from the outside towards the inside in conventional manner. Also, the filter fabric which extends around the bottom rigid structure of the bags and whose only purpose is to retain the bag on the structure wears fairly rapidly because of abrasion by the dusty gas which it is required to filter. It is also difficult to ensure a satisfactory sealing-tight securing of such filter fabric to the rigid structure of circular cross-section, since clamping collars fitted to the ends of the structure are needed.

It is an object of the present invention to obviate or at least mitigate the above-mentioned disadvantages, inter alia by reducing hindrances to the gas flow through the spaces between the bag bottoms and to obviate or at least mitigate any abrasion of the filter tissue at the place where the same is secured to a rigid structure.

According to the present invention there is provided a filter bag for a filter system, of the kind comprising a number of parallel channels embodied by interconnecting, along parallel assembly lines distributed over pocket length, two opposite side walls of the pockets, the side walls meeting at the open end of the pocket; and a frame introduced into each channel, the frame having two substantially parallel members which extend in a plane perpendicular or substantially perpendicular to the main direction of the pocket, such plane being equidistant from the two assembly lines forming the lateral boundaries of the particular channel concerned, wherein, at the bottom bag end near the bag end remote from the open end of the bag, the two substantially parallel members meet by way of a bottom member which is substantially perpendicular to the plane of the two substantially parallel members — that is which extends substantially in the main direction of the bag.

The invention also provides a filter system having a filter bag as defined in the preceding paragraph.

It will be appreciated that the present invention provides a new way of pleating or folding the bags to form the channels which is much simpler than the prior art. Also, the invention provides the assembly lines so that the various parallel channels which made up a bag are completely independent of one another as regards their filtering effect.

Also all the frames of a bag form a convenient structure therefor which gives the bag adequate rigidity.

In a filter bag according to the invention, therefore, at the bottom bag end (near the bag end remote from the open end of the bag), the two substantially parallel members meet by way of a bottom member which is substantially perpendicular to the plane of the two substantially parallel members — that is which extends substantially in the main direction of the bag.

Clearly, the lower part of a bag can, therefore, be given a tapered shape — that is, it can have a cross-section decreasing towards the bag bottom end. The gaps between the bottoms of adjacent bags are, therefore, increased, so that turbulence is reduced very considerably and there is a very considerable decrease in wear of the bag bottoms because of dust abrasion.

The invention relates more particularly to a preferred filter bag in which the two substantially parallel members of each frame comprises a pair of rigid rod-like members interconnected at the open end of the bag by a top member which extends in the plane of the rod-like members and which serves as a grip enabling the frame to be introduced into the corresponding channel, each of the two substantially parallel members being connected to the bottom member of the frame by way of an inclined part which is inclined both to the bottom member and to the corresponding substantially parallel member.

This feature makes it easier to devise the bottom member of each frame. More particularly, it is possible so as to devise matters that the inclination of the parts interconnecting the substantially parallel members of a frame to the bottom member thereof is produced by twisting the corresponding end of a frame from its original position, in which it is completely coplanar with the two substantially parallel members, around the longitudinal axis of the frame.

So that the frames may be symmetrical of their axis, the two inclined parts of each frame preferably extend on either side of the plane containing the corresponding two substantially parallel members and are of the same length.

According to another non-essential feature for a filter bag according to the invention and having at least one of the foregoing features, the frame at least for each of the two end channels of the bag has stiffening extending substantially over the whole length of the frame and perpendicularly to the plane containing the corresponding two substantially parallel members, the stiffening comprising at least one web or rib or the like extending towards the outside of the bag and possibly one web or rib or the like extending towards the inside of the bag.

Preferably, the stiffening is embodied by two metal members extending on either side of the plane containing the two substantially parallel members of the corresponding frame, the stiffening members being welded to cross-members interconnecting the two corresponding substantially parallel members.

Advantageously, the bag base is borne by a support rod which extends over the whole length of the bag and on which the frame bottom members bear by way of the bottom of the bag.

A will be seen hereinafter, this feature helps to reduce abrasion of the bag bottom, to facilitate the securing thereof to the rigid structure embodied by the support bar or rod, and to provide excellent sealing-tightness for the bag bottom.

As another possible feature for a filter bag according to the invention in which each of the channels has on either side of the bag centre-plane two longitudinal pleats extending over the whole length of the passage, the two substantially parallel members of the corresponding frame being engaged one in each pleat, at the end near the bag bottom the pleats are folded in the same direction in the bag centre-plane over a height of the support rod to which the folded parts of the pleats are secured, the pleats extending between the folded part and the unfolded part, along and inclined line superimposed on the contour of the corresponding inclined parts of the frame.

The pleating and folding feature just described is very simple to carry into effect and leads to the central section of each bag channel having a lozenge shape such that the bag has maximum filter area in a relatively reduced space; the feature also gives the bag bottom a tapered shape so that the bag bottom is of very reduced thickness.

According to an optional feature of the invention, a hem engaged on the support rod or bar or the like is formed between the folded part of the pleats formed on one of the bag side walls and the folded part of the pleats formed on the other bag side wall.

According to another preferred feature of the invention, the folded part of the pleats formed on one of the bag side walls and the folded part of the pleats formed on the other bag side wall are joined together over their entire length and are clamped between two support members interconnected, by elements extending through the folded parts, to form the actual support bar or rod.

Also, as a result of the latter feature, the parallel assembly lines extend over the whole length of the bag, inter alia over the whole height of the folded parts.

This feature helps to make the various channels making up a bag completely independent from one another in their filter effect.

To the same end, the unfolded part of the pleats is separated from the folded part by an assembly line extending near the bag bottom over the whole length of the bag.

The two latter features make it possible inter alia to still use a bag having one or possibly even a number of channels accidentally perforated, since such features provide complete sealing-tightness of any channel from the two adjacent channels.

Preferably, the assembly lines are embodied by sewing.

For a better understanding of the present invention and to show how the same may be put into effect, reference will now be made, by way of example, to the accompanying drawings, in which:

FIG. 1 shows a perspective view, with parts broken away, of a filter bag according to the present invention, FIGS. 2a and 2b show perspective views of a filter bag frame according to the invention, FIG. 2a showing an intermediate frame without stiffening while FIG. 2b shows an end frame with stiffening, FIG. 2c shows a partial plan view of the filter bag of FIG. 1, FIG. 3 shows a diagrammatic sectional view of a filter system having filter bags according to the invention, and FIG. 4 shows a partial perspective view of a filter system having filter bags according to the invention.

Referring now to the drawings, the filter bag shown in FIG. 1 comprises a row of parallel channels 1, for example six in number, the channels being formed by two opposite side walls of the bag which extend to an open oblong-shaped end 3 being joined together along parallel seam lines 2 distributed along the length of the pocket. The six channels 1 are, therefore, devised and are hermetically separated from one another by the seam lines 2. A frame 4 (intermediate frames are shown in FIG. 2a and end frames are shown in FIG. 2b is introduced into each channel; each frame 4 is made of a welded-rigid metal rod and comprises two substantially parallel side members 5 extending in a plane perpendicular to the main direction of the bag (see FIG. 1). The planes containing the members 5 are equidistant from one another and each disposed equidistant from two adjacent seam lines 2.

The two side members 5 of each frame 4 meet at their ends near the bag bottom 6 by way of a bottom frame member 7 which extends perpendicularly to the corresponding plane of the two side members 5 — that is, which extends in the main direction of the bag (see FIG. 1). Each side member 5 is connected to the bottom member 7 by an inclined part 8 which is at an inclination both to the bottom member 7 and to the corresponding side member 5.

The inclination of the parts or arms 8 can be produced by the corresponding end of a frame 4 being twisted from its original position, in which it is entirely coplanar with the side members 5, around the longitudinal axis of the frame 4. The two inclined parts or arms 8 of each frame 4 then extend on either side of the plane containing the two members 5 and are of the same length.

Also, the two side members 5 of each frame 4 are in known manner interconnected at the open end 3 of the bag by a top member 9 which is coplanar with the two side members 5 and which can serve as a handle enabling the frame to be introduced into the corresponding channel.

Because of the nature of the construction of the inclined arms 8, each frame can be introduced into the corresponding channel 1 without difficulties arising about frame orientation around its longitudinal axis, for the bottom member 7 extends along the length of the pocket.

To obviate any bending of the frames 4 in the two end channels 1 of the bag, such end frames have stiffening extending substantially over the whole length of the frame perpendicularly to the plane containing the corresponding two side members 5. Advantageously, and as can be seen in FIG. 2b, the stiffening takes the form of two identical metal ribs or webs or the like 10, one extending towards the outside of the bag and the other towards the inside of the bag. The outside edges 11 of the members 10 are rounded and bent inwardly so as not to pierce the bag, whereas the two inner edges 12 are bent at right angles and are welded to cross-members 13 interconnecting the two frame side members 5 and possibly to the two inclined arms 8. In any case, the other frames 4 — that is, the frames of the kind shown in FIG. 2a and not having such stiffening — also comprise cross-members 13 which are parallel to the frame top member 9 and which interconnect the two side members 5.

The bag bottom 6 is supported by a support member (rod or bar) 14 or 15 which extends over the whole length of the bag and even beyond the bag length and on which the frame bottom members 7 bear by way of the fabric of the bag bottom.

Each channel 1 comprises in known manner two longitudinal pleats 16, on either side of the bag centreplane, the pleats 16 being engaged one each by the side members 5 of the corresponding frame 4 so as to give each channel 1 a rigid lozenge-shaped cross-section in the manner visible in the plan view of FIG. 2c, two opposite sides of the lozenge extending along the frame side members 5 while the other two opposite sides correspond to the two seam lines 2 forming the lateral boundaries for the channel.

At the end near the bag bottom 6, the pleats 16 are all folded in the same direction — that is, to the right in FIG. 1 — in the bag centre plane — that is, in the plane passing exactly between the two members 14 and 15 which together make up the support rod or bar. The folded parts of the pleats 16 extend over a height at least equal to the height of the member 14 or 15, the two folded parts of the front and rear walls of the bag being adapted to be clamped hermetically between the two members 14 and 15. Accordingly, the same are secured to one another by screws or the like (not shown) which extend through apertures 17 in the members 14 and 15 and through corresponding apertures 18 at the bottom of the bag.

As a variant, only a single support member could be used, in which event such member would be engaged in a hem at the bottom of the bag, the hem being embodied by the two folded parts of the pleats 16.

However, the first embodiment hereinbefore described has the advantage that the bottom of the bag can be made very sealing-tight by prolonging the seam lines 2 into the folded part of the pleats 16.

Also, the unfolded part of the pleats 16 is separated from the folded part by a seam line 19 which extends over the whole length of the bag near the bottom thereof. The various channels 1 are therefore completely independent of one another and they are sealed off very thoroughly from the atmosphere outside the bag even near the bottom thereof.

In any case, between the folded part and the unfolded part of the bag side walls the pleats 16 each extend along an inclined line 20 exactly following the contour of the inclined arms 8 of the frames 4. Consequently, the frames 4 intimately follow the shape of the bag cross-section over the whole height of the bag and give it very good rigidity while also providing a tapered bag bottom increase the cross-section of each of the gaps between the bottoms of two adjacent bags of the filter system. The gas for filtering therefore does not experience turbulence in these passages and the presence of the members 14 and 15 obviates wear of the bag bottoms by abrasion.

Referring again to FIG. 1, the bottom part of the frames 4 centres readily on the members 14 and 15 because of the tapered shape of the bag bottom; to further facilitate centring the two members forming the complete support (14, 15) can cooperate along their top contiguous edges to form a flared shape. It is, therefore, unnecessary to provide special means for guiding the frames, inter alia at the top part thereof. Consequently, the frame top members 9 do not need to project upwardly beyond the plane of aperture 21 in bag cover 22. All that is needed is to provide a double grip or holding bar 23 having downwardly bent ends 24 engageable on the top members 9 of the two end frames 4 to lock the same and prevent them from moving towards one another as a result of lateral pressures.

Referring now to FIG. 3, there is shown a filter system having bags according to the foregoing description and disposed in an inlet chamber 25 and communicating by way of their open end 21 with an outlet chamber 26 separated from the inlet chamber 25 by a partition 27 carried on gaskets 28. Gas for filtering enters the system through an inlet line 29 and leaves through an outlet line 30. Below the filter bags 31 is a hopper 32 for recovering dust when the filter bags 31 are deplugged. The filter system can in known manner comprise means 33 for introducing a cleaning or deplugging gas into the filter bags 31 so as to inflate the same slightly and produce a temporary counter-current to make the retained particles drop. Since the bags are embodied by a number of lozenge-shaped channels, the counter-current flow of deplugging or cleaning gas distorts the bag fabric so that the curvature of the fabric reverses in each channel, with the result that retained particles which have been deposited on the outside surface of the bags are removed.

Also, and as can be seen in FIG. 4, the bags 31 are supported in the chamber 25 on a cradle 34 of metal tubes, the cradle having uprights 35 which are rigidly secured to partition 27, the cradle having two bottom longitudinal members 36. Secured to each member 36 is a castellated metal plate 37, the ends of the support members 14 and 15 being adapted to engage in castellations 38. Location of each filter bag 31 in the cradle 34 is considerably eased by this feature.

We claim:

1. A filter bag for a filter system, comprising a number of parallel channels having one open end and embodied by interconnecting, along parallel assembly lines distributed over bag length, two opposite side walls of the bag, the side walls meeting at the open end; and a frame introduced into each channel, the frame having two substantially parallel members which extend in a plane at least substantially perpendicular to the main direction of the bag, such plane being equidistant from the two assembly lines forming the lateral boundaries of the particular channel concerned, wherein, at the bottom bag end near the bag end remote from the open end of the bag, the two substantially parallel members have lower portions which are configured to meet by way of a bottom member which is substantially perpendicular to the plane of the two substantially parallel members — that is which extends substantially in the main direction of the bag, such that the frame as viewed perpendicularly to said plane tapers over its lower portion from a width determined by said parallel members to a substantially lesser width determined by said bottom member.

2. A filter bag according to claim 1 wherein the assembly lines are embodied by sewing.

3. A filter bag according to claim 1, wherein the frame at least for each of the two end channels of the bag has stiffening extending substantially over the whole length of the frame and perpendicularly to the plane containing the corresponding two substantially parallel members, the stiffening comprising at least one web extending towards the outside of the bag.

4. A filter bag according to claim 3, wherein the stiffening comprises two metal members extending respectively on opposite sides of the plane containing the two substantially parallel members of the corresponding frame, the stiffening members being welded to cross-members interconnecting the two corresponding substantially parallel members.

5. A filter bag according to claim 1, wherein the two substantially parallel members of each frame comprises a pair of rigid rod-like members interconnected at the open end of the bag by a top member which extends in the plane of the rod-like members and which serves as a grip enabling the frame to be introduced into the corresponding channel, each of the two substantially parallel members being connected to the bottom member of the frame by way of an inclined part which is inclined both to the bottom member and to the corresponding substantially parallel member.

6. A filter bag according to claim 5, wherein the inclination of the parts interconnecting the substantially parallel members of a frame to the bottom member thereof is produced by a twist in the corresponding end of a frame from its original position, in which it is completely coplanar with the two substantially parallel members, around the longitudinal axis of the frame.

7. A filter bag according to claim 5, wherein the two inclined parts of each frame extend respectively on opposite sides of the plane containing the corresponding two substantially parallel members and are of the same length.

8. A filter bag according to claim 5, wherein the bag base is borne by a support rod which extends over the whole length of the bag and on which the frame bottom members bear by way of the bottom of the bag.

9. A filter bag according to claim 8, wherein each of the channels has, on either side of the bag centre-plane, two longitudinal pleats extending over the whole length of the passage, the two substantially parallel members of the corresponding frame being engaged one in each pleat, the pleats at the end near the bag bottom being folded along the two substantially parallel members of the frames on the bag centre-plane over a height equal or substantially at least the height of the support rod to which the folded parts of the pleats are secured and the pleats extending, between the folded part and the unfolded part, along an inclined line superimposed on the contour of the corresponding inclined parts of the frame.

10. A filter bag according to claim 9, wherein a hem engaged on the support rod is formed between the folded part of the pleats formed on one of the bag side walls and the folded part of the pleats formed on the other bag side wall.

11. A filter bag according to claim 9, wherein the folded part of the pleats formed on one of the bag side walls and the folded part of the pleats formed on the other bag side wall are joined together over their entire length and are clamped between two support members which are interconnected by way of the folded parts to form the actual support rod.

12. A filter bag according to claim 11, wherein the parallel assembly lines extend over the whole length of the bag.

13. A filter bag according to claim 12, wherein the unfolded part of the pleats is separated from the folded part by an assembly line extending near the bag bottom over the whole length of the bag.

* * * * *